US006883718B1

(12) United States Patent
Le et al.

(10) Patent No.: US 6,883,718 B1
(45) Date of Patent: Apr. 26, 2005

(54) CREDIT CARD SIZED MEMORY CARD WITH HOST CONNECTOR

(75) Inventors: Trung V. Le, White Bear Township, MN (US); Thomas C. Kelly, White Bear Lake, MN (US)

(73) Assignee: Imation Corp., Oakdale, MN (US)

( * ) Notice: Subject to any disclaimer, the term of this patent is extended or adjusted under 35 U.S.C. 154(b) by 24 days.

(21) Appl. No.: 10/788,600

(22) Filed: Feb. 27, 2004

(51) Int. Cl.[7] ............................................. G06K 19/06
(52) U.S. Cl. ..................... 235/492; 235/441; 361/737; 710/62; 439/368
(58) Field of Search ................................. 235/441, 492; 361/737; 439/638; 710/62

(56) References Cited

U.S. PATENT DOCUMENTS

| | | |
|---|---|---|
| 6,148,354 A | 11/2000 | Ban et al. |
| 6,381,143 B1 | 4/2002 | Nakamura |
| 6,385,677 B1 | 5/2002 | Yao |
| 6,407,940 B1 | 6/2002 | Aizawa |
| 6,439,464 B1 * | 8/2002 | Fruhauf et al. ............. 235/492 |
| 6,490,667 B1 | 12/2002 | Ikeda |
| 6,501,163 B1 | 12/2002 | Utsumi |
| 6,567,273 B1 | 5/2003 | Liu et al. |
| 6,616,053 B2 | 9/2003 | Kondo et al. |
| 6,618,789 B1 | 9/2003 | Okaue et al. |
| 6,654,841 B2 | 11/2003 | Lin |
| 2002/0147882 A1 | 10/2002 | Pua et al. |
| 2002/0195500 A1 | 12/2002 | Maruyuma |
| 2003/0095386 A1 | 5/2003 | Le et al. |
| 2004/0087194 A1 * | 5/2004 | Wang et al. ................. 439/159 |

FOREIGN PATENT DOCUMENTS

| | | |
|---|---|---|
| CN | 1304115 | 7/2001 |
| EP | 1 132 824 A2 | 9/2001 |
| EP | 1 197 826 A1 | 4/2002 |

OTHER PUBLICATIONS

Co–pending U.S. Appl. No. 10/644,484, filed Aug. 20, 2003, Trung V. Le, entitled "Memory Card Compatible with Multiple Connector Standards".
Co–pending U.S. Appl. No. 10/788,594, filed Feb. 27, 2004, Trung V. Le et al., entitled "Memory Card Host Connector with Retractable Shieldless Tab".
Co–pending U.S. Appl. No. 10/788,591, filed Feb. 27, 2004, Trung V. Le., entitled "Multi–Connector Memory Card with Retractable Sheath to Protect the Connectors".
Co–pending U.S. Appl. No. 10/788,623, Trung V. Le, entitled "Memory Card Compatible with Device Connector and Host Connector Standards".

* cited by examiner

*Primary Examiner*—Thien M. Le
*Assistant Examiner*—Daniel A. Hess
(74) *Attorney, Agent, or Firm*—Eric D. Levinson (57) ABSTRACT

The invention is directed to a memory card that includes a host connector conforming to a host connection standard protruding from a flexible housing. The flexible housing conforms to a form factor of a memory card standard, substantially similar to a credit card with an increased thickness to accommodate the host connector and allow a memory to fit within the housing. The host connector facilitates direct coupling of the memory card to a computing device without an adapter or reader. The memory card may include a smart card contact conforming to an ISO 7816 smart card standard that allows the memory card to be backward compatible with conventional smart card readers. Unlike conventional memory cards, the flexible memory card is compatible with smart card applications, and unlike conventional smart cards, the flexible memory card includes a powerful, internal memory.

17 Claims, 8 Drawing Sheets

CREDIT CARD SIZED MEMORY CARD WITH HOST CONNECTOR

TECHNICAL FIELD

The invention relates to removable storage media devices and, in particular, removable memory cards.

BACKGROUND

A wide variety of removable storage media exists for transferring data from one computing device to another computing device or to a portable, consumer electronic device. The removable storage media allows users to easily transport data between various devices and various computers. One of the most popular types of removable storage media is the flash memory card, which is compact, easy to use, and has no moving parts. A flash memory card includes an internal, high-speed solid-state memory capable of persistently storing data without application of power. Numerous other memory standards can also be used in memory cards, including electrically-erasable-programmable-read-only-memory (EEPROM), non-volatile random-access-memory (NVRAM), and other non-volatile or volatile memory types, such as synchronous dynamic random-access-memory (SDRAM), with battery backup.

A wide variety of memory cards have been recently introduced, each having different capacities, access speeds, formats, interfaces, and connectors. Examples of memory cards include CompactFlash™ (CF) first introduced by SanDisk™ Corporation, the Memory Stick™ (MS) and subsequent versions including Memory Stick Pro and Memory Stick Duo developed by Sony Corporation, Smart Media™ memory cards, Secure Digital (SD) memory cards, and MultiMedia Cards (MMCs) jointly developed by SanDisk Corporation and Siemens AG/Infineon Technologies AG, and xD™ digital memory cards developed by Fuji. The memory cards listed above typically conform to rigid form factors and are not compatible with credit card applications.

Another type of memory card is a smart card. Smart cards are widely used as financial transaction credit cards, security access cards, electronic toll collection cards, debit cards, and the like. Smart card technology allows data to be stored in a memory element included in a smart card contact conforming to the ISO 7816 smart card standard. The smart card contact is molded, laminated and/or glued within a credit card sized flexible plastic housing. Unlike the memory cards described above, smart cards are compatible with credit card applications that require authentication keys stored in a secured memory. However, the limited card thickness of smart cards allows the memory element of conventional smart cards to store only a small amount of data compared to the memory element of other types of memory cards.

Conventional memory cards generally require a specialized adapter or reader for use with a computing device. The adapter or reader includes a specialized interface that conforms to that of the memory card, and an interface that can be accepted by a computer. For example, an adaptor or reader may include an interface to receive a memory card and an interface to connect to a host computer, such as a personal computer memory card international association (PCMCIA) interface including a 16 bit standard PC Card interface and a 32 bit standard CardBus interface, a Universal Serial Bus (USB) interface, a Universal Serial Bus 2 (USB2) interface, a future generation USB standard, an IEEE 1394 FireWire interface, a Small Computer System Interface (SCSI) interface, an Advance Technology Attachment (ATA) interface, a serial ATA interface, an Integrated Device Electronic (IDE) standard, an Enhanced Integrated Device Electronic (EIDE) standard, a Peripheral Component Interconnect (PCI) interface, a PCI Express interface, a conventional serial or parallel interface, or the like.

Most conventional adapters and readers support only a single type of memory card, causing a user to carry and interchange adapters or readers when using different types of memory cards.

SUMMARY

In general, the invention is directed to a memory card that includes a host connector protruding from a flexible housing and conforming to a host connection standard. The flexible housing conforms to a form factor of a memory card standard that is substantially similar to a credit card. However, the housing may have an increased thickness relative to conventional credit cards in order to accommodate the host connector and allow a memory to fit within the housing. The host connector facilitates direct coupling of the memory card to a computing device without an adapter or reader. Unlike conventional memory cards, the flexible memory card is compatible with smart card applications, and unlike conventional smart cards, the flexible memory card includes a powerful, internal memory. The increased thickness of the card facilitates increased memory capacity in the smart card, relative to conventional smart cards.

In some embodiments, the host connector is a shieldless tab compatible with the host connection standard and including a thickness equal to or less than the thickness of the flexible housing. For example, the shieldless tab may comprise a Universal Serial Bus (USB) compatible tab without a conventional electrical shield typically used with USB connectors. In other embodiments, the host connector includes an electrical shield modified to be at least as thin as the memory card standard form factor conformed to by the housing, such as a USB plug with a modified shield.

The memory card may include a smart card contact conforming to an ISO 7816 smart card standard that couples to a memory within the housing. The smart card contact can allow the memory card to be backward-compatible with conventional smart card readers. In some embodiments, the memory card may include a magnetic stripe to be backward-compatible with conventional credit card magnetic stripe readers. In other embodiments, a passive RF antenna chip may be included in the memory card to be compatible with RF readers that access a memory within the memory card by powering the RF antenna chip for a short period of time, similar to RFID technology. In that case, the smart card may eliminate the need for an electrical contact accessible through the flexible housing.

The flexible housing may define a corner edge from which the host connector protrudes. Furthermore, the housing may define dimensions which substantially conform to conventional smart card dimensions, albeit with increased thickness. In addition, the memory card may include a cover that fits over the host connector to protect the host connector and conform the memory card to the memory card standard form factor. Alternatively, a sleeve may be used to store the memory card and protect the host connector.

In one embodiment, the invention is directed to a memory card comprising a flexible housing, a memory in the housing, a smart card contact, and a host connector. The smart card contact is disposed on the housing and conforms to a smart card standard such as ISO 7816. Moreover, the smart card contact allows access to the memory by a reader compatible with the smart card standard. The host connector protrudes from the housing and conforms to a host connection standard. Furthermore, the host connector allows access to the memory upon insertion of the host connector into a computer interface compatible with the host connection standard.

In another embodiment, the invention is directed to a memory card comprising a flexible housing, a memory in the housing, and a host connector. The flexible housing has dimensions which substantially conform to a form factor of a memory card standard including a height between approximately 52 mm and 56 mm, a width between approximately 83.6 mm and 87.6 mm, and a thickness between approximately 1.3 mm and 2.3 mm. The host connector protrudes from the housing, conforms to a host connection standard, and allows access to the memory upon insertion of the host connector into a computer interface compatible with the host connection standard.

In another embodiment, the invention is directed to a memory card comprising a flexible housing, a memory in the housing, and a host connector. The flexible housing defines a first major edge between approximately 52 mm and 56 mm and a second major edge between approximately 83.6 mm and 87.6 mm, and a corner edge, wherein the corner edge reduces lengths of adjacent edges to define a third major edge of the housing less than 52 mm and a fourth major edge of the housing less than 83.6 mm. The host connector protrudes from the corner edge, conforms to a host connection standard, and allows access to the memory upon insertion of the host connector into a computer interface compatible with the host connection standard.

The invention may be capable of providing many advantages. For example, the host connector provides direct access to the memory card from a computing device without the need for an adapter or reader. Additionally, the flexible housing is thin and lightweight allowing the memory card to be carried in a wallet, similar to a credit card. As a further advantage, the powerful, internal memory enhances smart card applications and allows the memory card to store additional data not related to smart card or credit card applications. The increased thickness relative to conventional smart cards may allow for such increases in memory capacity.

In addition, the memory may be partitioned into two regions to allow both secured and non-secured data storage access. Secured memory is desirable to store an authentication key for performing financial transactions with the memory card while non-secure memory is desirable to enable the memory card to operate substantially similar to a conventional removable memory drive. By partitioning the memory, both secure and non-secure memory can be provided from the same memory element.

In some embodiments, the memory may be partitioned to include a region that stores firmware for the memory card. In that case, firmware updates may be received via the host connector to upgrade the memory card. When a firmware update is received via the host connector, the memory may be repartitioned in order to match the allocated firmware storage space to the size of the firmware update. For example, if the firmware update is larger than the original firmware, the memory is repartitioned such that the non-secured storage space is reduced in order to increase the firmware storage space to accommodate the firmware update. Conversely, the firmware storage space may also be reduced if a received firmware update is smaller than the original firmware, which increases the non-secured storage space.

The details of one or more embodiments of the invention are set forth in the accompanying drawings and the description below. Other features, objects, and advantages of the invention will be apparent from the description and drawings, and from the claims.

DETAILED DESCRIPTION

Figure 1A:
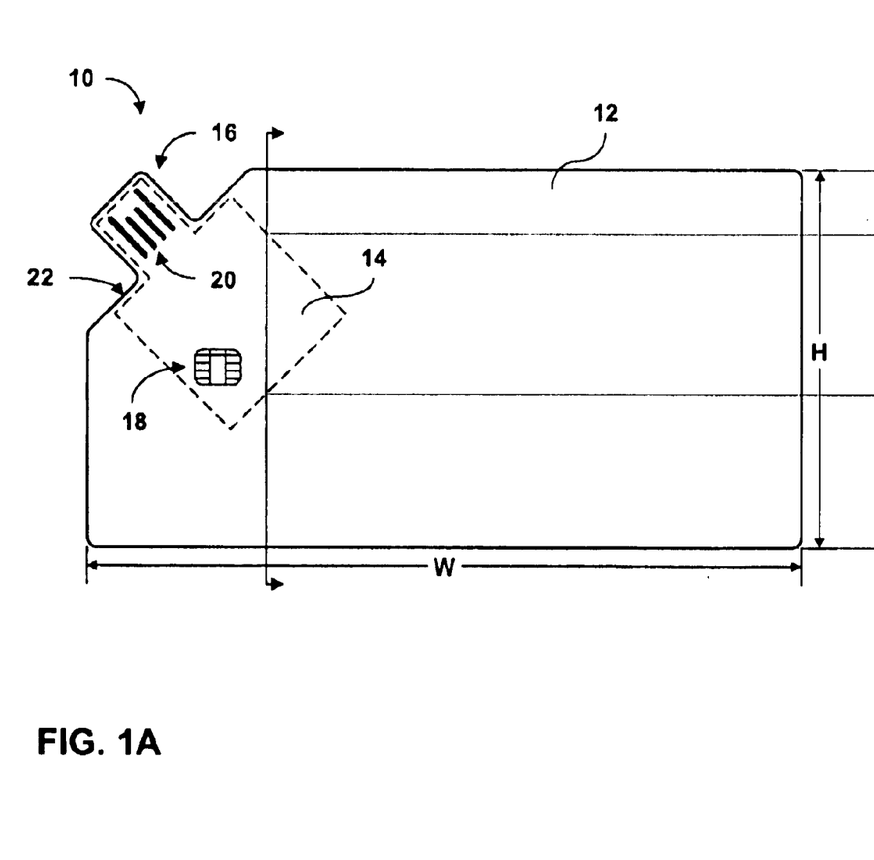
FIG. 1A is a conceptual front view illustrating an exemplary embodiment of a memory card.
Figure 1B:
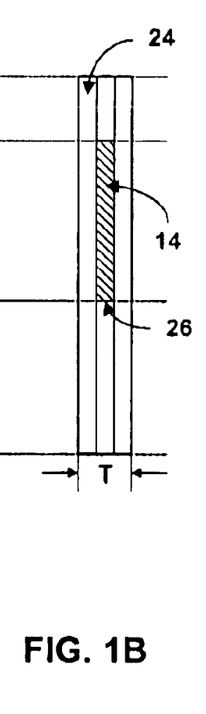
FIG. 1B is a conceptual side view illustrating the memory card of FIG. 1A.

FIG. 1A is a conceptual front view and FIG. 1B is a conceptual side view illustrating an exemplary embodiment of a memory card 10. Memory card 10 includes a flexible housing 12, an integrated circuit (IC) module 14 within housing 12, a shieldless tab host connector 16 (hereinafter 'shieldless tab 16') including electrical contacts 20, and a smart card contact 18. Unlike conventional memory cards, memory card 10 is compatible with smart card applications, and unlike conventional smart cards, memory card 10 includes a powerful, internal memory. IC module 14 includes the memory (not shown) electrically coupled to electrical contacts 20 of shieldless tab 16 and to smart card contact 18. In some embodiments, the memory within IC module 14 is partitioned into a secured memory and a non-secured memory such that memory card 10 can perform credit card applications requiring an authentication key stored in the secured memory as well as store data unrelated to credit card or smart card applications in the non-secured memory. The memory may be further partitioned to include a third region that stores firmware updates received via shieldless tab 16 to upgrade the secured and non-secured memory.

Shieldless tab 16 conforms to a host connection standard and allows access to the memory within IC module 14 upon insertion of shieldless tab 16 into a host computer interface compatible with the host connection standard. Memory card 10 directly couples to a host computer via shieldless tab 16. Accordingly, memory card 10 substantially eliminates the need for a memory card adapter or reader to retrieve data stored in a memory within memory card 10. Therefore, memory card 10 may perform smart card applications without a smart card reader or smart card contact 18. Shieldless tab 16 is one example of a host connector according to embodiments of the invention. Other embodiments of host connectors may also be used, including other types of host connectors with or without shields.

Smart card contact 18 conforms to a smart card standard such as an ISO 7816 that allows access to a memory within IC module 14 by a reader compatible with the smart card standard. In addition, the memory within IC module 14 can be accessed via shieldless tab 16, e.g., by a host computer interface of a host computing device. Smart card contact 18 can make memory card 10 backward-compatible with conventional smart card readers. In particular, smart card contact 18 allows memory card 10 to operate substantially similar to a conventional smart card without altering readers used by conventional smart card applications. For example, memory card 10 may be compatible with conventional financial transaction credit card applications, security access card applications, electronic toll collection card applications, debit card applications, and the like.

Housing 12 conforms to a form factor of a memory card standard with a width (W) and a height (H) substantially similar to a credit card, and with a thickness (T) approximately twice as thick as a conventional credit card. The memory card standard form factor includes a height between approximately 52 mm and 56 mm, a width between approximately 83.6 mm and 87.6 mm, and a thickness between approximately 1.3 mm and 2.3 mm.

As shown in FIG. 1A, housing 12 defines a corner edge 22 from which shieldless tab 16 protrudes. Corner edge 22 slightly alters the form factor of memory card 10 such that one side of memory card 10 comprises a height less than 52 mm and another side of memory card 10 comprises a width less than 83.6 mm. In other embodiments, shieldless tab 16 may protrude from any side of housing 12 as long as shieldless tab 16 does not extend beyond the dimensions of the memory card standard form factor. In some cases, memory card 10 may include a cover that fits over shieldless tab 16 to protect shieldless tab 16 and conform memory card 10 to the memory card standard form factor. Alternatively, a sleeve may be used to store memory card 10 and protect shieldless tab 16.

Housing 12 may be constructed using several layers of a material 24, such as plastic. As shown in FIG. 1B, housing 12 comprises three layers of material 24, the middle layer includes a cut-out to form a cavity 26 in housing 12 sized to hold IC module 14. In other embodiments, housing 12 may be a single piece of material 24 that includes a cavity formed in the material 24 and sized to hold IC module 14. In further embodiments, housing 12 may be molded or laminated around IC module 14 such that the presence of IC module 14 creates cavity 26 within material 24 which is molded or laminated.

In the embodiment shown in FIG. 1A, shieldless tab 16 is integrally molded as a part of housing 12, e.g., to define a shape that conforms to the host connection standard associated with shieldless tab 16. In other words, housing 12 and shieldless tab 16 can be molded as a single continuous plastic element with the electrical components of shieldless tab 16 being molded or laminated within the plastic. In any case, shieldless tab 16 protrudes from corner edge 22.

Electrical contacts 20 are disposed on shieldless tab 16. Electrical contacts 20 provide an electrical path to the memory within IC module 14. All of the electrical components of IC module 14 and the electrical components of shieldless tab 16 may be laminated within the plastic material 24 to define the form factor illustrated in FIGS. 1A and 1B. In other embodiments, shieldless tab 16 may be formed separately from housing 12 and can be connected to IC module 14 through corner edge 22. Also, shieldless tab 16 and IC module 14 may be preformed and then IC module 14 can be laminated to create the credit card-like shape illustrated in FIG. 1A.

Shieldless tab 16 may comprise an altered version of a conventional connector interface in order to define a thickness equal to or less than the thickness of housing 12 conforming to the memory card standard form factor of memory card 10. For example, shieldless tab 16 may comprise a Universal Serial Bus (USB) compatible tab without an electrical shield. Electrical contacts 20 disposed on shieldless tab 16 maintain compatibility with the host connection standard regardless of the form of shieldless tab 16. Shieldless tab 16 may conform to a variety of standards as long as a thickness substantially similar to housing 12 is maintained. Other examples of host connection standards include a personal computer memory card international association (PCMCIA) standard including a 16 bit standard PC Card interface and a 32 bit standard CardBus interface, a USB2 standard, a future generation USB standard, an IEEE 1394 FireWire standard, a Small Computer System Interface (SCSI) standard, an Advance Technology Attachment (ATA) standard, a serial ATA standard, a Peripheral Component Interconnect (PCI) standard, a PCI Express standard, a conventional serial or parallel interface standard, or the like. The standards described herein refer to such standards as defined on the filing date of this patent application.

In some embodiments, memory card 10 may comprise a host connector including an electrical shield modified to be at least as thin as the housing of memory card 10. For example, the host connector may comprise a USB plug with a modified shield.

In the example where shieldless tab 16 comprises a USB compatible tab without an electrical shield, the elimination of the shield greatly reduces a thickness of the host connector, which allows shieldless tab 16 to protrude from housing 12 without increasing an overall thickness of memory card 10. Furthermore, the invention eliminates the need for an electrical shield because shieldless tab 16 directly couples to the memory within IC module 14 and to a host computer interface without a cable. Conventionally, the electrical shield is used to improve signal transmission over a cable. Thus, by eliminating the conventional USB cable a shieldless USB tab can be used for direct coupling of the memory within IC module 14 to a host computer.

Figure 2:
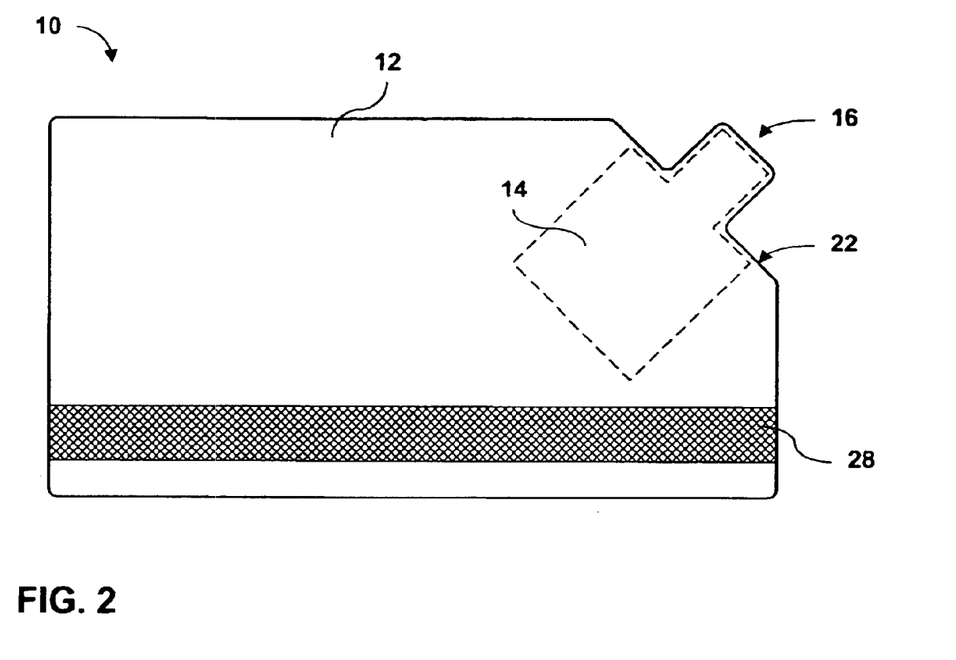
FIG. 2 is a conceptual back view illustrating an exemplary embodiment of a memory card.

FIG. 2 is a conceptual back view illustrating an exemplary embodiment of memory card 10 from FIGS. 1A and 1B. Memory card 10 includes flexible housing 12, IC module 14 within housing 12, shieldless tab 16 protruding from corner edge 22 of housing 12, and a magnetic stripe 28. Magnetic stripe 28 conforms to a magnetic stripe standard that allows access to the memory within IC module 14 by a magnetic stripe reader coupled to a host computing device. In this way, memory card 10 may be backward-compatible with conventional magnetic stripe readers often used for credit card and debit card financial transactions. Magnetic stripe 28 allows memory card 10 to operate substantially similar to a conventional credit card without altering readers used by conventional credit card applications.

In some embodiments, memory card 10 may also include a passive RF antenna chip within housing 12 coupled to the memory in IC module 14. The RF antenna chip allows memory card 10 to be backward-compatible with conventional RF readers. An RF reader powers the RF antenna chip for a short period of time to access information stored in the memory within IC module 14. The RF antenna chip may operate substantially similar to RFID technology. RF capabilities may be used in addition to or as an alternative to an electrical smart card contact 18.

Although shieldless tab 16 eliminates the need for a smart card, magnetic stripe, or RF reader to couple the memory within IC module 14 to a computing device, the presence of magnetic stripe 28, smart card contact 18, and/or an RF antenna chip adds versatility to memory card 10. In another example, memory card 10 may be used as an electronic toll collection card in which an RF antenna chip disposed within memory card 10 is scanned as a user drives through a toll area. Electronic toll collection areas may not be updated as rapidly as the memory cards used as electronic toll collection cards. Therefore, new memory card technology for smart card applications needs to be backward-compatible with conventional smart card applications. If used for an electronic toll application, the host connector may allow a user to access toll information via a personal computer simply by plugging shieldless tab 16 into a port of the personal computer, e.g., a USB port.

Figure 3A:
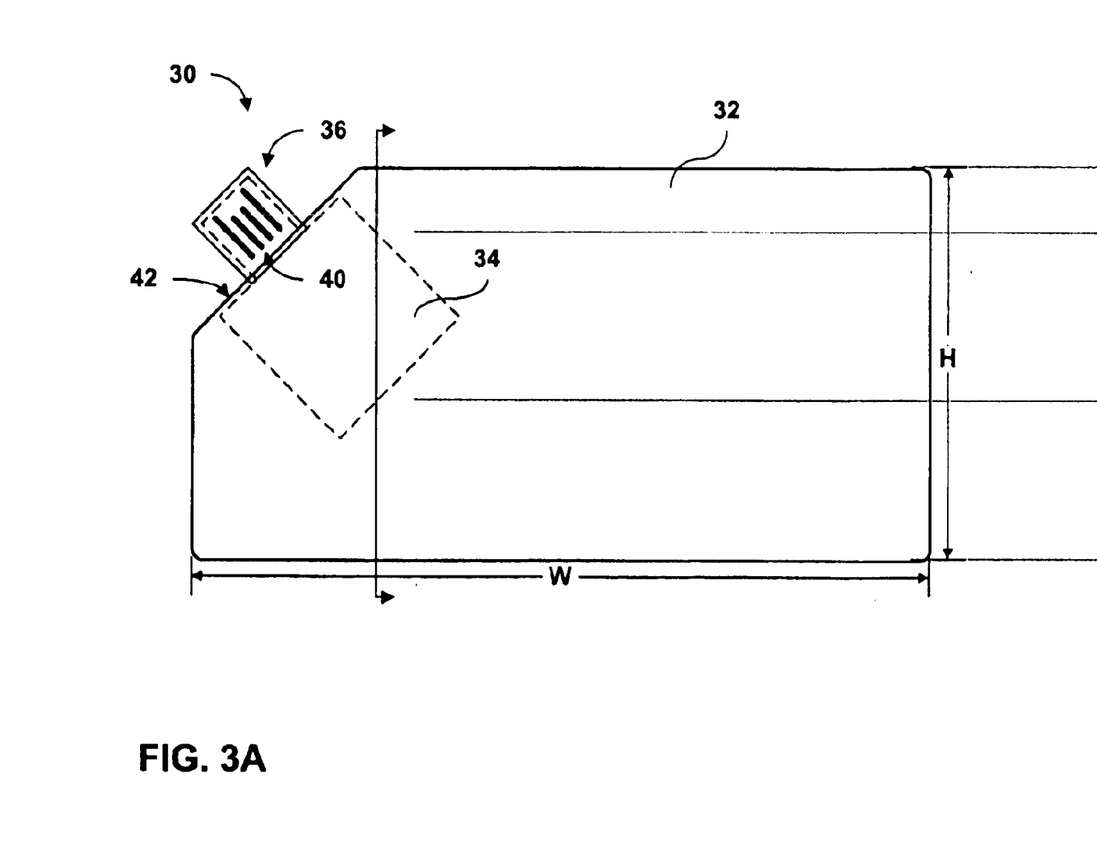
FIG. 3A is a conceptual front view illustrating another exemplary embodiment of a memory card.
Figure 3B:
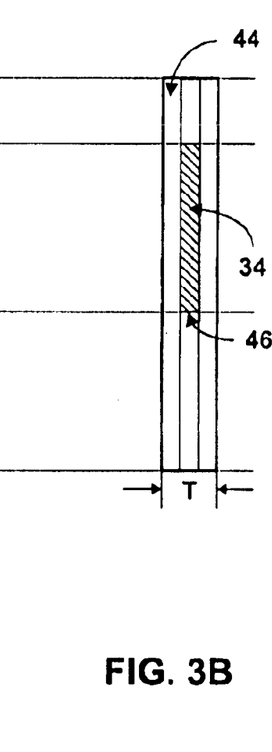
FIG. 3B is a conceptual side view illustrating the memory card of FIG. 3A.

FIG. 3A is a conceptual front view and FIG. 3B is a conceptual side view illustrating an exemplary embodiment of a memory card 30. Memory card 30 includes a flexible housing 32, an integrated circuit (IC) module 34 within housing 32, and a shieldless tab host connector 36 (hereinafter 'shieldless tab 36') with electrical contacts 40. IC module 34 includes the memory (not shown) electrically coupled to electrical contacts 40 of shieldless tab 36. Shieldless tab 36 may operate substantially similar to shieldless tab 16 from FIGS. 1A and 1B. Unlike conventional memory cards, memory card 30 is compatible with smart card applications, and unlike conventional smart cards, memory card 30 includes a powerful, internal memory that can only be accessed via shieldless tab 36.

Shieldless tab 36 conforms to a host connection standard and allows access to the memory within IC module 34 upon insertion of shieldless tab 36 into a host computer interface compatible with the host connection standard. Memory card 30 directly couples to a host computer via shieldless tab 36. Accordingly; memory card 30 substantially eliminates the need for a memory card adapter or reader to retrieve data stored in a memory within memory card 30. Therefore, memory card 30 may perform smart card applications without a smart card reader or a smart card contact, such as smart card contact 18 from FIG. 1A.

Housing 32 conforms to a form factor of a memory card standard with a width (W) and a height (H) substantially similar to a credit card, and with a thickness (T) approximately twice as thick as a credit card. The memory card standard form factor includes a height between approximately 52 mm and 56 mm, a width between approximately 83.6 mm and 87.6 mm, and a thickness between approximately 1.3 mm and 2.3 mm. The thickness (T) of housing 32 may also precisely conform to the thickness of a USB tab without a shield so that housing 32 and shieldless tab 36 provide constant thickness to memory card 30.

Housing 32 may be formed substantially similar to housing 12 of memory card 10 described above in reference to FIGS. 1A and 1B. Housing 32 defines a corner edge 42 from which shieldless tab 36 protrudes. Additionally, housing 32 may be constructed using several layers of a material 32, such as plastic. Housing 32 may comprise three layers of material 44 including a middle layer with a cut-out to form a cavity 46 in housing 32 sized to hold IC module 34. In the embodiment shown in FIG. 3A, shieldless tab 36 is formed separately from housing 32 and inserted through corner edge 42 into cavity 46. Electrical contacts 40 are coupled to the memory within IC module 34. Corner edge 42 of housing 32 may then be sealed around shieldless tab 36. In still other embodiments, housing 32 may be a single piece of material that includes a cavity formed within the material to hold IC module 34. In still other embodiments, housing 32 may be molded or laminated around IC module 34 such that the presence of IC module 34 creates a cavity in the molded material.

Figure 4:
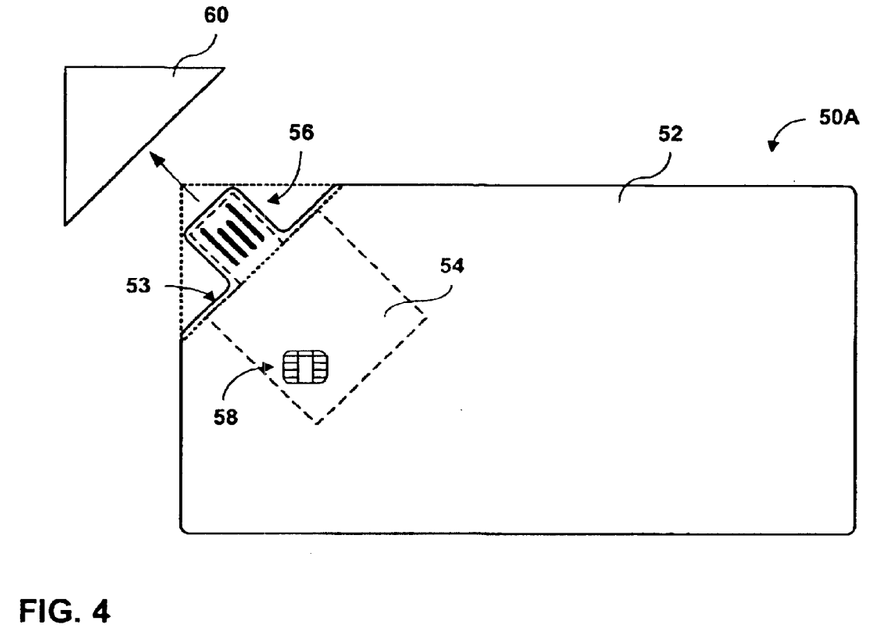
FIG. 4 is a conceptual front view illustrating an exemplary embodiment of a memory card including a removable cover.

FIG. 4 is a conceptual front view illustrating an exemplary embodiment of a memory card 50A including a removable cover 60. Memory card 50A includes a flexible housing 52 defining a corner edge 53, an integrated circuit (IC) module 54 within housing 52, a shieldless tab host connector 56 (hereinafter 'shieldless tab 56') protruding from corner edge 53, and a smart card contact 58. Shieldless tab 56 may be connected to memory card 50A substantially similar to any of memory cards 10 and 30.

Housing 52 conforms to a form factor of a memory card standard substantially similar to housing 12 and housing 32 described above. However, corner edge 52 and shieldless tab 56 alter the form factor of memory card 50A such that memory card 50A does not exactly conform to the memory card standard form factor. In the embodiment shown in FIG. 4, removable cover 60 fits over shieldless tab 56 in order to conform memory card 50A to the memory card standard form factor. An exterior of cover 60 defines to a triangular shape and an interior of cover 60 defines a cavity sized to fit shieldless tab 56. Cover 60 may snap onto housing 52 around corner edge 53 to conform corner edge 53 to a corner of the memory card standard form factor.

Cover 60 protects shieldless tab 56 from being damaged. For example, using memory card 10 as a conventional smart card may subject shieldless tab 56 to excessive handling by a user, which may expose electrical contacts disposed on shieldless tab 56 to electrostatic effects. Furthermore, an uncovered shieldless tab 56 may bend or break when memory card 50A is stored in a user's wallet.

In other embodiments, shieldless tab 56 may protrude from any side of housing 52 as long as shieldless tab 56 does not extend beyond the dimensions of the memory card standard form factor. In that case, a cover formed to fit over shieldless tab 56 and conform memory card 10 to the memory card standard form factor may be used.

Figure 5:
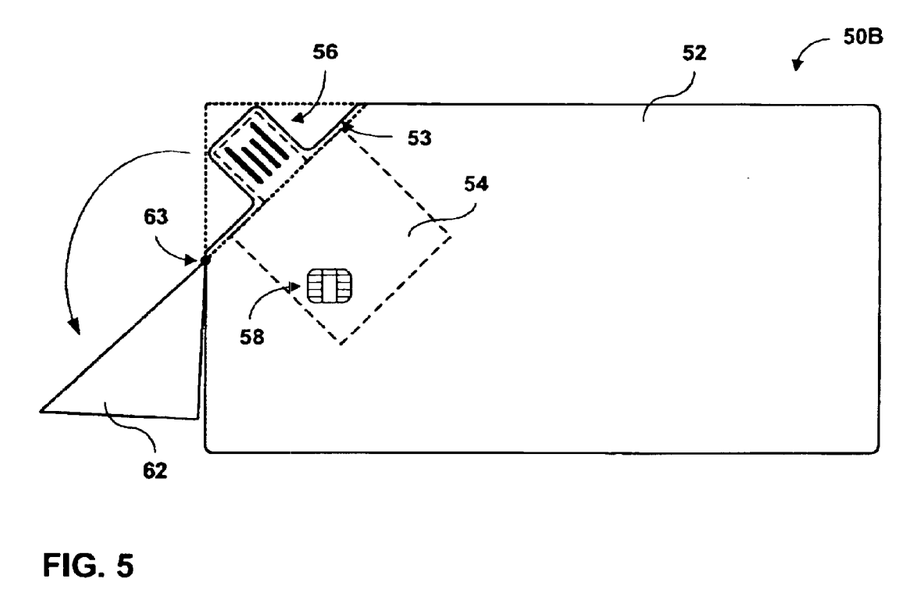
FIG. 5 is a conceptual front view illustrating an exemplary embodiment of a memory card including a hinged cover.

FIG. 5 is a conceptual front view illustrating an exemplary embodiment of memory card 50B including a hinged cover 62. Memory card 50B again includes flexible housing 52 defining corner edge 53, integrated circuit (IC) module 54 within housing 52, shieldless tab 56 protruding from corner edge 53, and smart card contact 58.

In the embodiment shown in FIG. 5, hinged cover 62 fits over shieldless tab 56 in order to conform memory card 50B to the memory card standard form factor. Cover 62 connects to housing 52 of memory card 50B via a hinge 63. Hinge 63 allows cover 62 to be removed from shieldless tab 56, but remain attached to housing 52. Cover 62 rotates about hinge 63 to allow shieldless tab 56 to be inserted into a host computer interface of a host computing device.

Figure 6:
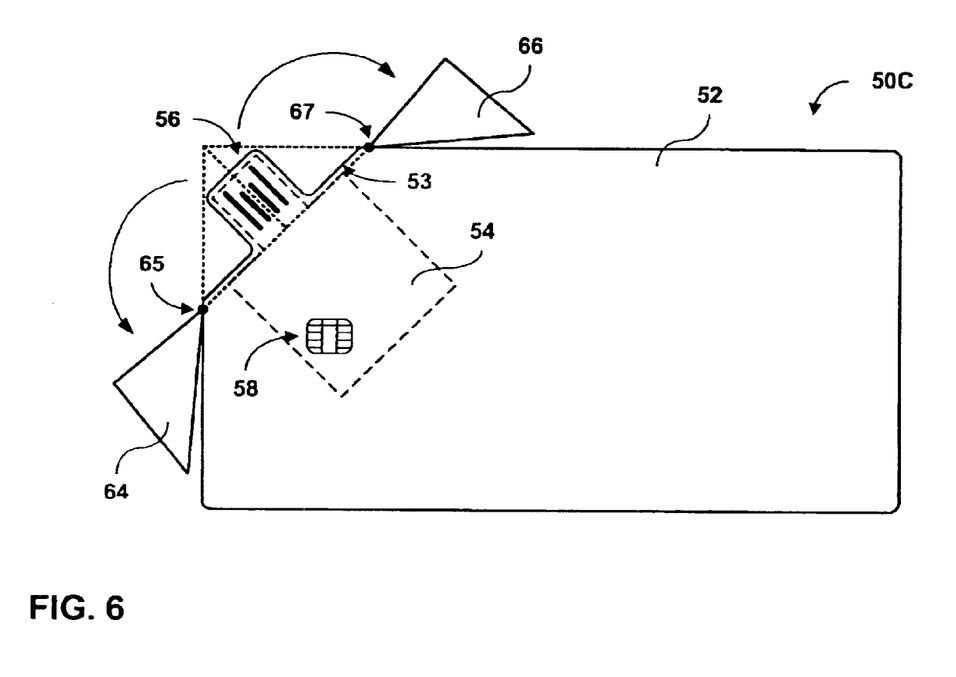
FIG. 6 is a conceptual front view illustrating an exemplary embodiment of a memory card including hinged covers.

FIG. 6 is a conceptual front view illustrating an exemplary embodiment of memory card 50C including a plurality of hinged covers 64 and 66. Memory card 50C again includes flexible housing 52 defining corner edge 53, integrated circuit (IC) module 54 within housing 52, shieldless tab 56 protruding from corner edge 53, and smart card contact 58.

In the embodiment shown in FIG. 6, first hinged cover 64 and second hinged cover 66 combine to conform memory card 50C to the memory card standard form factor. First cover 64 fits over a first half of shieldless tab 56 and second cover 66 fits over a second half of shieldless tab 56. First cover 64 connects to housing 52 of memory card 50C via a hinge 65. Second cover 66 connects to housing 52 via a hinge 67. Hinges 65 and 67 allow covers 64 and 66, respectively, to be removed from shieldless tab 56 while remaining attached to housing 52. Covers 64 and 66 rotate about their respective hinges to allow shieldless tab 56 to be inserted into a host computer interface of a host computing device.

In other embodiments beyond those shown in FIGS. 4–6, a wide variety of covers may be used to protect a shieldless tab host connector and conform a memory card to a memory card standard form factor. Such covers are particularly useful for protecting a shieldless tab when not in use because the elimination of the shield makes the tab more susceptible to breakage.

Figure 7:
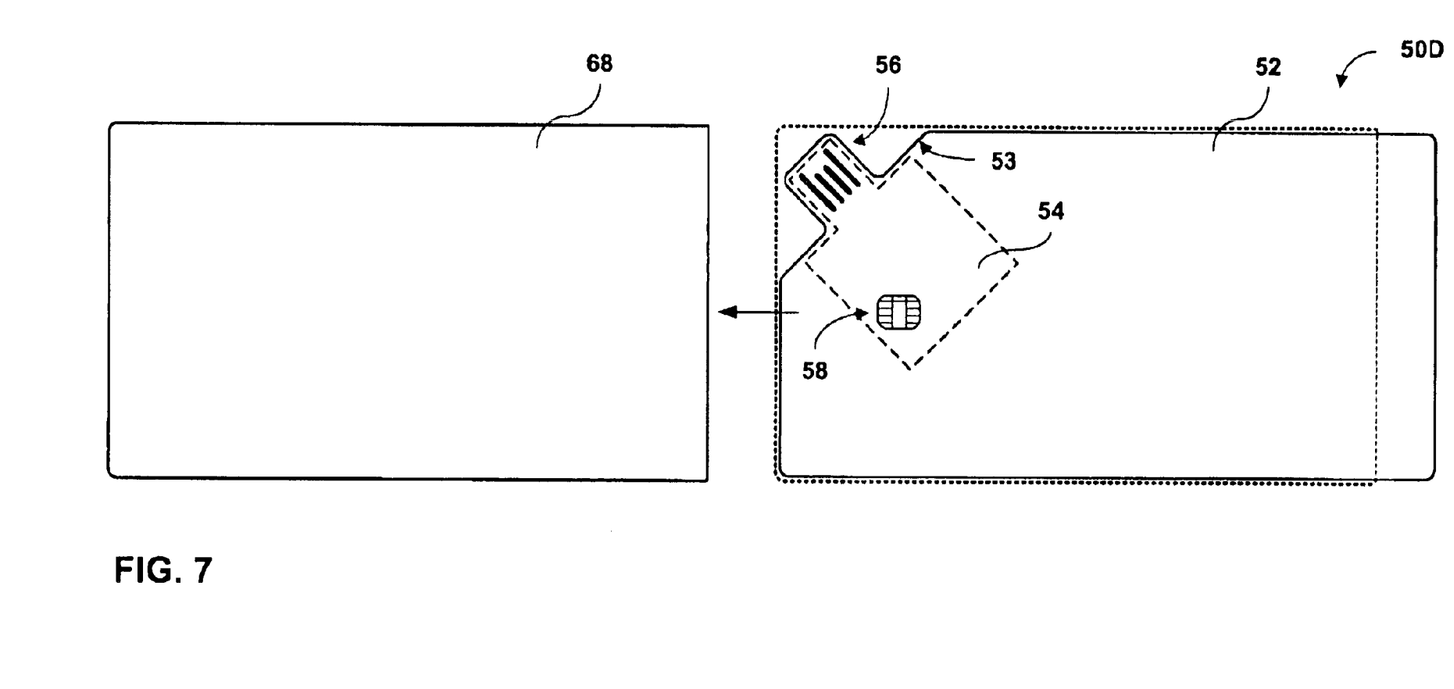
FIG. 7 is a conceptual front view illustrating a system including a memory card and a removable sleeve.

FIG. 7 is a conceptual front view illustrating a system including memory card 50D and a removable sleeve 68. Memory card 50D again includes flexible housing 52 defining corner edge 53, integrated circuit (IC) module 54 within housing 52, shieldless tab 56 protruding from corner edge 53, and smart card contact 58.

In the embodiment shown in FIG. 7, removable sleeve 68 slips over housing 52 in order to store memory card SOD. Sleeve 68 also protects shieldless tab 56 and smart card contact 58 from excessive handling by a user, which may expose the electrical contacts to electrostatic effects. In addition, sleeve 68 protects shieldless tab 56 from bending or breaking when memory card 50D is carried in a user's wallet. Sleeve 68 may include a rigid element to ensure against bending or breaking of memory card SOD.

In embodiments where shieldless tab 56 protrudes from a different side of housing 52 than corner edge 53, sleeve 68 is able to cover shieldless tab 56 without alteration as long as shieldless tab 56 does not extend beyond the dimensions of the memory card standard form factor.

Figure 8:
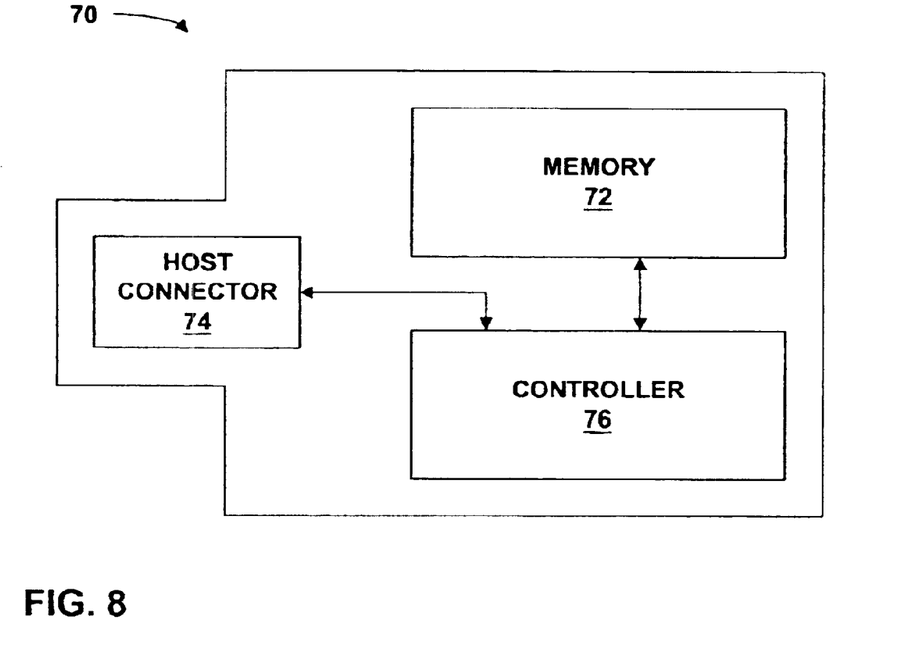
FIG. 8 is a block diagram illustrating an exemplary architecture of an IC module, which may be included in the memory card illustrated in FIGS. 3A and 3B.

FIG. 8 is a block diagram illustrating an exemplary architecture of an integrated circuit (IC) module 70, which may be included in memory card 30 or other memory cards described herein. IC module 70 includes a memory 72, a host connector 74, and a controller 76. Host connector 74 conforms to a host connection standard and allows access to memory 72 upon insertion into a host computer interface compatible with the host connection standard. Host connector 74 may be electrically coupled to memory 72 via controller 76. Controller 76 controls the memory 72 and output via host connector 74.

By way of example, memory 72 may comprise one or more element of flash memory, electrically-erasable-programmable-read-only-memory (EEPROM), non-volatile random-access-memory (NVRAM), and other nonvolatile or volatile memory types, such as synchronous dynamic random-access-memory (SDRAM), or the like. Preferably, memory 72 comprises flash memory or another high-speed solid-state memory capable of persistently storing data without the application of power. Memory 72 may include a plurality of such memory elements in order to support large memory capacity.

Controller 76 comprises a memory controller integrated with a host connector controller. Controllers that integrate memory and host connector controls are commercially available for use in conventional portable memory drives that include a memory and a single host connector. In other embodiments, two separate controllers may be used for memory 72 and host connector 74. Controller 76 integrates such functionality of two different controllers into a common unit that consumes less space and power on IC module 70.

Power is applied to IC module 70 when it is connected via the host connection standard to a host computer interface of a host computing device. The application of power activates electrical contact elements within host connector 74 and enables controller 76 to facilitate access to memory 72. Communication between the computing device and memory 72 may then be sent through the powered host connector 74 and the enabled controller 76. The computing device may read or modify data that is stored in memory 72 as well as store new data or erase existing data. Controller 76 manipulates the data stored in memory 72 according to operations specified by the computing device.

In one embodiment, IC module 70 includes host connector 74 in the form of a Universal Serial Bus (USB) tab without the conventional USB shield. IC module 70 also includes controller 76 conforming to a flash memory drive controller and memory 72 conforming to a flash memory. Host connector 74 may couple directly to a computing device's USB port allowing communication between the computing device and controller 76 without an adaptor or reader. These components are readily available due to their wide usage in traditional removable memory drives.

Host connector 74 may couple directly to a host computer interface conforming to the same host connection standard and enable communication between the computing device and memory 72. The invention eliminates the need for an adapter or reader to couple memory card 70 to the computing device by including an adapter's function in the memory card.

Figure 9:
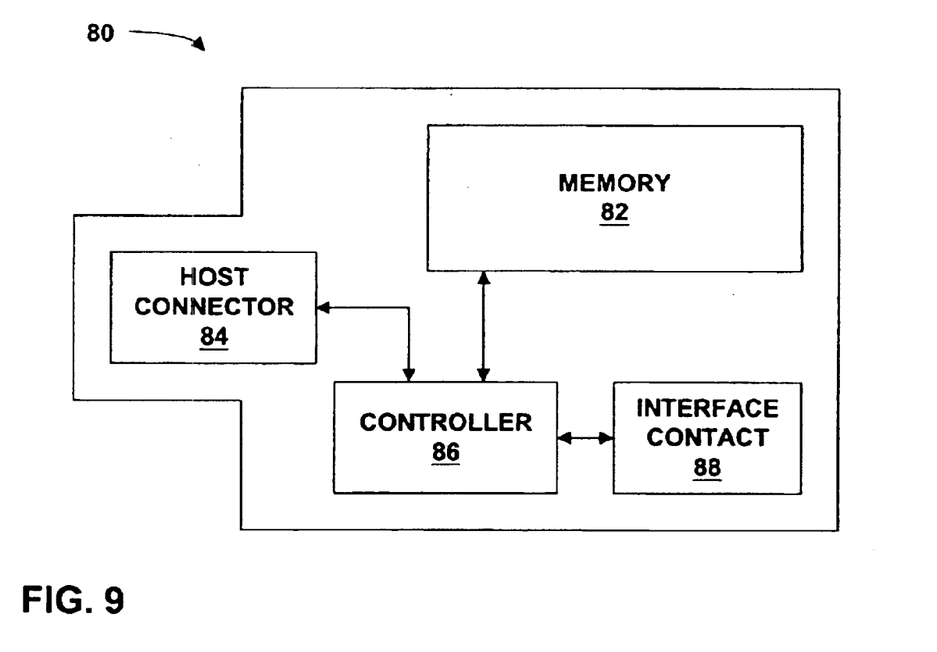
FIG. 9 is a block diagram illustrating an exemplary architecture of an IC module, which may be included in the memory card from FIGS. 1A and 1B.

FIG. 9 is a block diagram illustrating an exemplary architecture of an IC module 80, which may be included in memory card 10 or other memory cards described herein. IC module 80 includes a memory 82, a host connector 84, a controller 86, and a smart card contact 88. Memory 82 may operate substantially similar to memory 72 from FIG. 8. Host connector 84 conforms to a host connection standard and allows access to memory 82 upon insertion into a host computer interface compatible with the host connection standard. Smart card contact 88 conforms to an ISO 7816 smart card standard and makes IC module 80 backward compatible by allowing access to memory 82 by a reader compatible with the smart card standard.

Host connector 84 may be electrically coupled to memory 82 via controller 86. Smart card contact 88 may also be electrically coupled to memory 82 via controller 86. Controller 86 comprises a memory controller integrated with a host connector controller and a smart card contact controller. In some embodiments, two controllers may be used. For example, a first controller for memory 82 and host connector 84, substantially similar to those used in conventional portable memory drives, and a second controller for smart card contact 88 coupled to the first controller to access memory 82. In another example, a first controller may control memory 82 and host connector 84, as described above, and a second controller may control memory 82 and smart card contact 88. Both of the controllers may be coupled directly to memory 82. In other embodiments, three separate controllers may be used for memory 82, host connector 84, and smart card contact 88. Controller 86, however, integrates such functionality of multiple controllers into a common unit that consumes less space and power on IC module 80. The use of separate controllers may simplify the creation of the memory card, however, because separate controllers may be commercially available.

Power is applied to IC module 80 when it is connected to a computing device via host connector 84 inserted into a host computer interface or via smart card contacts 88 inserted into a smart card reader. The application of power activates electrical contact elements within host connector 84 or smart card contact 88 and enables controller 86 to facilitate access to memory 82. Communication between the computing device and memory 82 may then be sent through the powered host connector 84 or the powered smart card contact 88 and the enabled controller 86. The computing device may read or modify data that is stored in memory 82 as well as store new data or erase existing data. Controller 86 manipulates the data stored in memory 82 according to operations specified by the computing device.

In one embodiment of the invention, IC module 80 includes host connector 84 in the form of a USB tab without a conventional shield. IC module 80 also includes controller 86 conforming to a flash memory drive controller with smart card control and memory 82 conforming to a flash memory. Host connector 84 may couple directly to a computing device's USB port allowing communication between the computing device and controller 86 without an adaptor or reader. Smart card contact 88 may couple to a smart card reader connected to a host computer interface of a computing device allowing communication between the computing device and controller 86. The flash memory drive controller with smart card control may be developed as an application specific integrated circuit (ASIC) integrating the functionality of a conventional flash memory drive controller and a smart card contact controller.

Host connector 84 may couple directly to a host computer interface conforming to the same host connection standard and enable communication between the computing device and memory 82. Smart card contact 88 may couple to a reader conforming to the smart card standard that connects to a computing device and operate substantially similar to a conventional smart card. The invention eliminates the need for an adapter or reader to couple IC module 80 to the computing device by including an adapter's function in the IC module. The invention also allows IC module 80 to be compatible with conventional smart card readers, which increases functionality.

Figure 10:
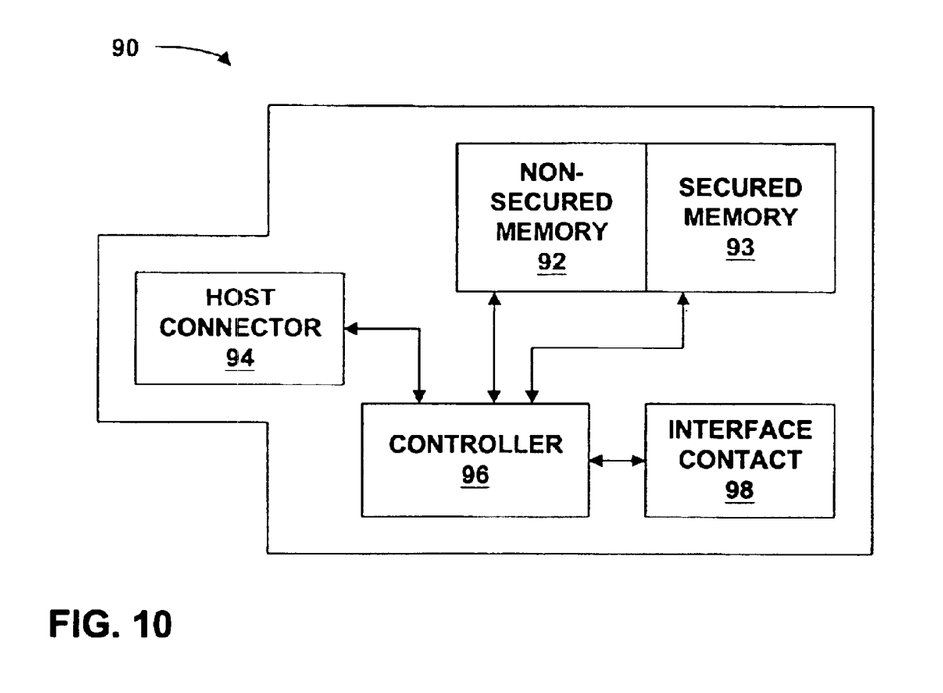
FIG. 10 is a block diagram illustrating another exemplary architecture of an IC module, which may be included in the memory card from FIGS. 1A and 1B.

FIG. 10 is a block diagram illustrating another exemplary architecture of an IC module 90, which may be included in memory card 10 or other memory cards described herein. In this embodiment, memory card 90 includes a memory partitioned into a secured memory 93 and a non-secured memory 92, a host connector 94, a controller 96, and a smart card contact 98. Host connector 94 and smart card contact 98 may operate substantially similar to host connector 84 and smart card contact 88, respectively, from FIG. 9.

Smart card contact 98 conforming to a smart card standard is compatible with credit card applications that require authentication keys stored in a secure memory. Therefore, smart card contact 98 may be electrically coupled to secured memory 93 via controller 96. Host connector 94 conforming to a host connection standard is also compatible with credit card applications. However, host connector 94 may also transfer data not related to secured access credit card applications. Host connector 94 may be electrically coupled to both secured memory 93 and non-secured memory 92 via controller 96.

Controller 96 comprises a dual-memory controller integrated with a host connector controller and a smart card contact controller. In other embodiments, up to four separate controllers may be used for secured memory 93, non-secured memory 92, host connector 94, and smart card contact 98. The separate controller may also be combined with each other similar to those described in reference to FIG. 9. Controller 96 integrates such functionality of multiple controllers into a common unit that consumes less space and power on IC module 90. Again, separate controllers may be desirable from a design standpoint because separate controllers could be purchased.

Controller 96 may accept firmware updates from a computing device via host connector 94, allowing for easy upgrades of IC module 90. The memory may be partitioned beyond secured memory 93 and non-secured memory 92 to include a third region that stores the firmware updates. The memory may also be repartitioned at the time a firmware update is received to match the allocated firmware storage space to the size of the firmware update. For example, if the firmware update is larger than the original firmware, the memory is repartitioned such that non-secured memory 92 is reduced in order to increase the firmware storage space to accommodate the firmware update. Conversely, the firmware storage space may also be reduced if a received firmware update is smaller than the original firmware, which increases non-secured memory 92.

In one embodiment, memory card 90 includes host connector 98 in the form of a USB tab without a conventional USB shield. Memory card 90 also includes controller 96 conforming to a flash memory drive controller with smart card control, and secured memory 93 and non-secured memory 92 each conforming to a flash memory. The flash memory drive controller with smart card control may be developed as an application specific integrated circuit (ASIC) integrating the functionality of a conventional flash memory drive controller and a smart card contact controller. Host connector 94 may couple directly to a computing device's USB port allowing communication between the computing device and controller 96. Smart card contact 98 may couple to a smart card reader connected to a host computer interface of a computing device allowing communication between the computing device and controller 96. Controller 96 manipulates the data stored in either secured memory 93 or non-secured memory 92 according to operations specified by the computing device.

Various embodiments of the invention have been described. For example, a memory card has been described that is compatible with smart card and credit card applications and includes a host connector that directly couples the memory card to a computing device. A smart card contact has also been described that may be disposed on the memory card to make the memory card backward compatible with a conventional smart card reader. In addition, a housing of the memory card conforms to a form factor of a memory card standard substantially similar to a credit card. A cover has also been described that fits over the host connector protruding from the housing to protect the host connector and conform the memory card to the memory card standard form factor. Further, a system including the memory card and a sleeve has been described wherein the sleeve may be slipped over the memory card to store the memory card and protect the host connector.

Nevertheless, various modifications may be made without departing from the scope of the invention. For example, the host connector may protrude from any edge of the housing and a variety of types of covers or sleeves may be used to protect the host connector and conform the memory card to the memory card standard form factor. Moreover, although the disclosure generally describes the host connector as a shieldless tab, the host connector may conform to a shielded version of any of host connection standards as long as a thickness substantially similar to the memory card standard form factor is maintained. In addition, the same features described herein may be incorporated into memory cards of other sizes and shapes, such as cards significantly smaller or larger than credit cards. These and other embodiments are within the scope of the following claims.

What is clamed is:

1. A memory card comprising:
   a flexible housing;
   a memory in the housing;
   a smart card contact disposed on the housing, the smart card contact conforming to a smart card standard and allowing access to the memory by a reader compatible with the smart card standard; and
   a host connector protruding from the housing, the host connector conforming to a host connection standard and allowing access to the memory upon insertion of the host connector into a host computer interface compatible with the host connection standard.

2. The memory card of claim 1, wherein the memory is included within an integrated circuit (IC) module wherein the housing is formed at least partially around the IC module.

3. The memory card of claim 1, wherein the smart card standard comprises an ISO 7816 Smart Card standard.

4. The memory card of claim 1, wherein the housing defines a corner edge from which the host connector protrudes.

5. The memory card of claim 1, wherein the host connector is molded as a part of the housing such that the housing defines a shape that conforms to the host connection standard.

6. The memory card of claim 1, further comprising a cover over the host connector, wherein the housing and the cover collectively substantially conform the memory card to a form factor of the smart card standard.

7. The memory card of claim 1, further comprising a magnetic stripe disposed on the housing compatible with a magnetic stripe reader.

8. The memory card of claim 1, wherein the flexible housing comprises at least two layers of plastic and a cavity formed between the layers of plastic to hold the memory.

9. The memory card of claim 1, wherein the memory includes a first region for secured memory access and a second region for non-secured memory access.

10. The memory card of claim 1, wherein the host connector conforms to one of a Universal Serial Bus (USB) standard and a Universal Serial Bus 2 (USB2) standard and comprises a USB compatible tab without an electrical shield.

11. A memory card comprising:
    a flexible housing having dimensions which substantially conform to a form factor of a memory card standard including a height between approximately 52 mm and 56 mm, a width between approximately 83.6 mm and 87.6 mm, and a thickness between approximately 1.3 mm and 2.3 mm;
    a memory in the housing, wherein the height and width dimensions of the memory card substantially conform to an ISO 7816 smart card standard and the memory card can be accessed by a smart card reader; and
    a host connector protruding from the housing, the host connector conforming to a host connection standard and allowing access to the memory upon insertion of the host connector into a computer interface compatible with the host connection standard, wherein the host connector defines part of the housing such that the housing defines a thickness dimension that substantially conforms to the host connection standard, and whereing the host connector portion of the housing is defined within the height and width dimensions of the ISO 7816 smart card standard.

12. The memory card of claim 11, wherein the housing defines a corner edge from which the host connector protrudes, the corner edge defined within the dimensions of the ISO 7816 smart card standard.

13. The memory card of claim 11, wherein the housing includes a cover that fits over the host connector to precisely conform the memory card to the form factor of the memory card standard.

14. The memory card of claim 11, wherein the host connector conforms to one of a Universal Serial Bus (USB) standard and a Universal Serial Bus 2 (USB2) standard and comprises a USB compatible tab without an electrical shield.

15. The memory card of claim 11, further comprising a smart card contact disposed on the housing, the smart card contact conforming to the ISO 7816 smart card standard and allowing access to the memory by a reader compatible with the smart card standard.

16. The memory card of claim 15, wherein the thickness of the housing is approximately twice a thickness of a form factor of the ISO 7816 smart card standard.

17. A memory card comprising:
    a flexible housing defining a first major edge between approximately 52 mm and 56 mm and a second major edge between approximately 83.6 mm and 87.6 mm, and a corner edge, wherein the corner edge reduces lengths of adjacent edges to define a third major edge of the housing less than 52 mm and a fourth major edge of the housing less than 83.6 mm;
    a memory in the housing wherein the memory card substantially conforms to an ISO 7816 smart card standard and the memory can be accessed by a smart card reader; and
    a host connector protruding from the corner edge, the host connector conforming to a host connection standard and allowing access to the memory upon insertion of the host connector into a computer interface compatible with a host connection standard, wherein the host connector does not extend beyond the first or second major edges of the housing such that the host connector protruding from the corner edge is defined within the height and width dimensions of the ISO 7816 smart card standard.

* * * * *